United States Patent
Sprangle et al.

(10) Patent No.: US 6,925,550 B2
(45) Date of Patent: Aug. 2, 2005

(54) SPECULATIVE SCHEDULING OF INSTRUCTIONS WITH SOURCE OPERAND VALIDITY BIT AND RESCHEDULING UPON CARRIED OVER DESTINATION OPERAND INVALID BIT DETECTION

(75) Inventors: Eric Sprangle, Portland, OR (US); Michael J. Haertel, Portland, OR (US); David J. Sager, Portland, OR (US)

(73) Assignee: Intel Corporation, Santa Clara, CA (US)

(*) Notice: Subject to any disclaimer, the term of this patent is extended or adjusted under 35 U.S.C. 154(b) by 568 days.

(21) Appl. No.: 10/040,223

(22) Filed: Jan. 2, 2002

(65) Prior Publication Data
US 2003/0126417 A1 Jul. 3, 2003

(51) Int. Cl.[7] ................................................ G06F 9/38
(52) U.S. Cl. ...................... 712/214; 712/23; 712/217; 712/218
(58) Field of Search ................... 712/23, 214, 217, 712/218

(56) References Cited

U.S. PATENT DOCUMENTS

| | | | |
|---|---|---|---|
| 5,452,426 A | * | 9/1995 | Papworth et al. ........... 712/217 |
| 5,553,256 A | * | 9/1996 | Fetterman et al. .......... 712/217 |
| 5,845,103 A | * | 12/1998 | Sodani et al. ............... 712/216 |
| 5,966,544 A | | 10/1999 | Sager |
| 6,094,717 A | | 7/2000 | Merchant et al. |
| 6,163,838 A | | 12/2000 | Merchant et al. |
| 6,212,626 B1 | | 4/2001 | Merchant et al. |
| 6,304,953 B1 | | 10/2001 | Henstrom et al. |

* cited by examiner

Primary Examiner—Kenneth S. Kim
(74) Attorney, Agent, or Firm—Blakely, Sokoloff, Taylor & Zafman LLP

(57) ABSTRACT

A method and apparatus to execute data speculative instructions in a processor comprising at least one source register, each source register comprising a bit to indicate validity of data in the at least one source register. A data validity circuit coupled to the one or more source registers to determine the validity of the data in the source registers, and to indicate the validity of the data in a destination register based upon the validity bit in the at least one source register. The processor optionally comprising a checker unit to retire those instructions from the execution unit which write valid data to the destination register, and to re-schedules those instructions for execution which write invalid data to the destination register.

23 Claims, 3 Drawing Sheets

SPECULATIVE SCHEDULING OF INSTRUCTIONS WITH SOURCE OPERAND VALIDITY BIT AND RESCHEDULING UPON CARRIED OVER DESTINATION OPERAND INVALID BIT DETECTION

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of electronics. In particular, the present invention is related to a method and apparatus to execute instructions in a processor.

2. Description of the Related Art

Out-of-order processors commonly use a pipelining technique wherein multiple instructions are overlapped in execution in an effort to improve the overall performance of the processor e.g., a microprocessor. Pipelining is a technique that exploits parallelism among the processor instructions in a sequential instruction stream. Pipelining increases the processor's instruction throughput, without reducing the execution time of an individual instruction. This allows for a processor to execute a program faster with a lower total execution time, even though no single instruction runs faster.

In a pipelined processor, the latency from scheduling an instruction to executing the instruction, and then confirming the instruction executed correctly may be significantly longer than the latency of the instruction. Therefore, to minimize the effective latency of the instruction, dependent instructions should be scheduled before confirming that the first instruction executed correctly. In a pipelined processor, a scheduler speculatively schedules instructions assuming that all instructions will execute properly (e.g., all load instructions will hit in data cache). Thus, a situation may arise that prevents the next instruction in the instruction stream from executing correctly during its designated clock cycle if the instruction requires the results of the previous instruction in order for it to execute correctly. When this occurs, the processor must determine which instructions have not executed properly, either because the instruction was not able to generate the correct result given the correct input values, or the instruction could not generate the correct result because it was not provided with the correct input values.

BRIEF SUMMARY OF THE DRAWINGS

Examples of the present invention are illustrated in the accompanying drawings. The accompanying drawings, however, do not limit the scope of the present invention. Similar references in the drawings indicate similar elements.

DETAILED DESCRIPTION OF THE INVENTION

Described is a method and apparatus to process instructions using a validity bit. In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention.

Parts of the description is presented using terminology commonly employed by those skilled in the art to convey the substance of their work to others skilled in the art. Also, parts of the description will be presented in terms of operations performed through the execution of programming instructions. As well understood by those skilled in the art, these operations often take the form of electrical, magnetic, or optical signals capable of being stored, transferred, combined, and otherwise manipulated through, for instance, electrical components.

Figure 1:
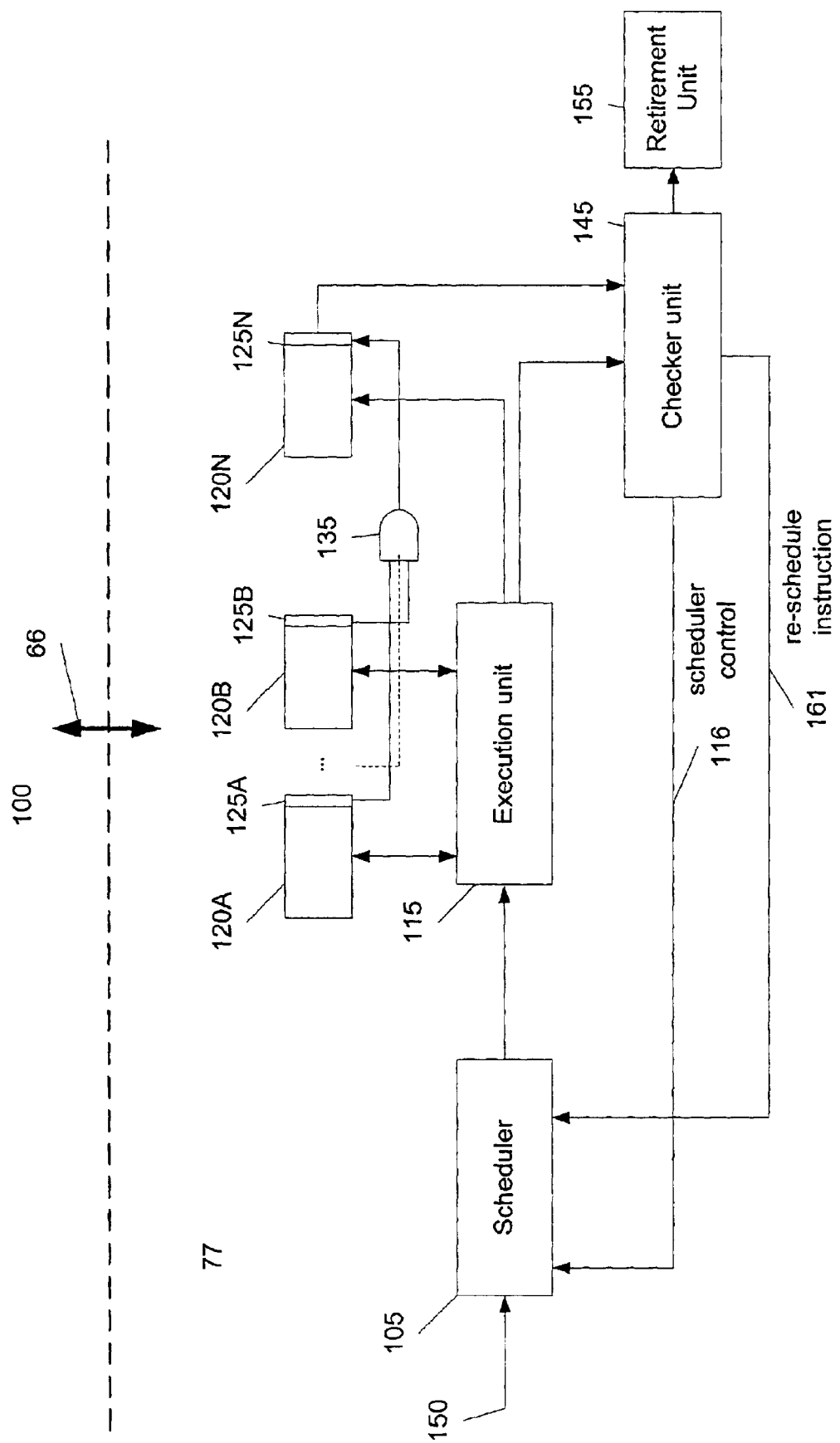
FIG. 1 illustrates a block diagram of a processor according to one embodiment of the invention.

FIG. 1 illustrates a block diagram of a processor according to one embodiment of the invention. As illustrated in FIG. 1, computer system 100 comprises a processor 77 that is coupled to various components of computer system 100, e.g., a memory unit (not shown) via a system bus 66. The memory unit may include random access memory, read only memory or some other permanent or temporary storage device. In one embodiment, processor 77 is an out-or-order processor.

Processor 77 includes a scheduler 105 that receives instructions (e.g., from an instruction queue) via bus 150. The instructions received by processor 77 are microoperations (i.e., instructions generated by transforming complex instructions into fixed length instructions). Each microoperation or instruction has one or more sources (from which data is read) and at least one destination (to which data is written). In one embodiment, the source or the destination may be one or more registers within processor 77, cache memory, or even permanent and/or temporary memory (e.g., random access memory RAM).

Scheduler 105 is coupled to an execution unit 115. In one embodiment, scheduler 105 sends instructions from the instruction queue, or instructions from checker unit 145 to execution unit 115 for execution. Execution unit 115 executes instructions received from scheduler 105. Execution unit 115 may be a floating-point arithmetic logic unit (ALU), a load executing unit (i.e., an executing unit that computes the address location of data, and loads the data from the computed address location), etc.

Executing unit 115 is coupled to one or more registers 120A, 120B, ... 120N. Although, in the embodiment of FIG. 1, only three registers (i.e., 120A, 120B, and 120N) are illustrated, other embodiments may have more than three registers as illustrated by the dashed line in between registers 120A and 120B in FIG. 1. In one embodiment, the registers are general-purpose registers and data may be read from and written to each of the registers. In one embodiment, each register has a bit (called the validity bit) stored in register locations 125A–N in corresponding registers 120A–N that determines the validity of the data in each register. Thus, each register may have an additional bit (i.e., a validity bit) that is contiguous with the data bits in the register. In some embodiments every register has a validity bit to determine the validity of the data in the register, in alternate embodiments, some registers may have a validity bit, and other registers may not. In one embodiment, the validity bit is not contiguous with the data bits in the registers but is maintained separate from the register (e.g., in a table). However, a one to one correspondence is maintained between the data in each register and the validity bit. In one embodiment, if the data in a particular register is invalid data, then the validity bit may be set to a logic '1', else the validity bit it is set to a logic '0'.

In one embodiment, the validity bit may be set to a logic '1' if a cache 'hit' occurs, else if a cache 'miss' occurs the validity bit is set to a logic '0'. A cache miss occurs, for example, if the address tag of the cache block that contains the desired information does not match the block address from the processor.

Figure 2:
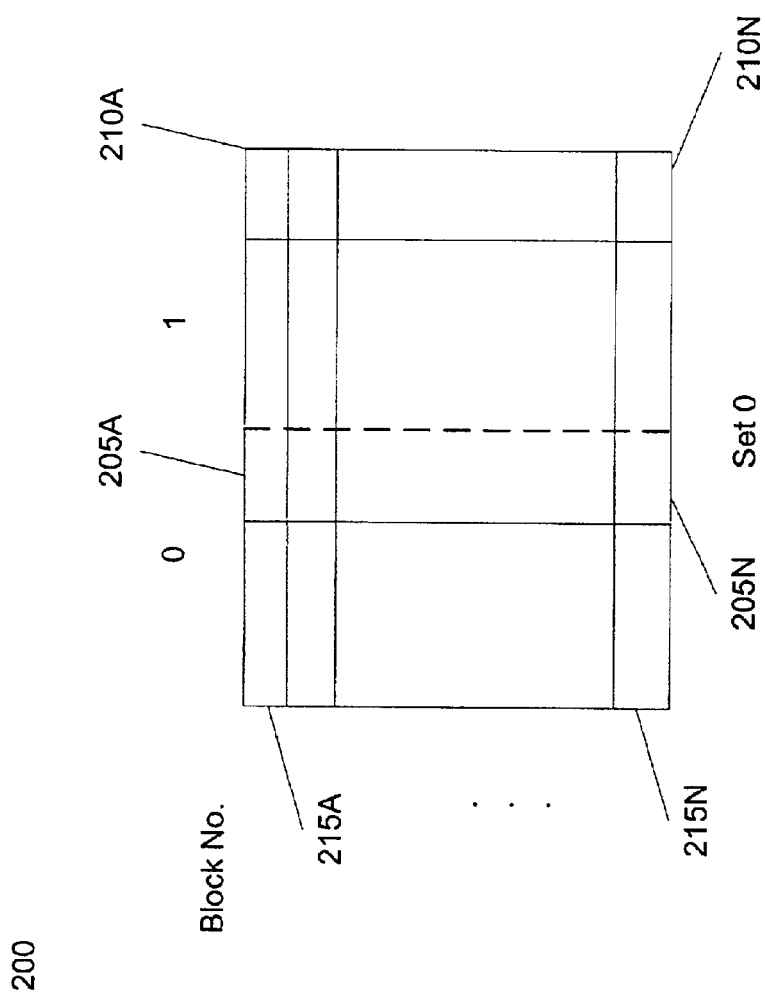
FIG. 2 illustrates cache memory with validity bits according to one embodiment of the invention.

FIG. 2 illustrates cache with validity bits according to one embodiment of the invention. In FIG. 2, a set associative cache 200 is illustrated, with set 0 having two blocks 0 and 1. Data is stored in the cache in rows 215A–215N. For a given block of cache, e.g., block 0, each row of data 215A–215N in a block has a corresponding validity bit (e.g., validity bits 205A–205N). So also for block 1, rows 215A–215N have corresponding validity bits 210A–210N. The validity bits are set to a logic '0' when a cache hit occurs, else it is set to a logic '1' (i.e., when a cache miss occurs).

In one embodiment, as illustrated in FIG. 1, when an instruction (e.g., a load instruction) is scheduled for execution by scheduler 105, the data including the validity bit are read from cache into registers in processor 77 in accordance with the load instruction. Thus, the registers within processor 77 receive not only the data from cache, but also the validity bit. In particular, the register sizes are increased by at least one bit to accommodate both the data and the validity bit. Although the example above illustrates setting the validity bit whenever a cache miss occurs, other embodiments set the validity bit whenever the data in a register, or a memory location, is invalid. For example, if during execution of a shift operation the next instruction scheduled by the scheduler for execution is executed by execution unit 115, and the next instruction requires the results from the shift operation, then the register that is used as the source register for the next instruction has its validity bit set to indicate invalid data in the register because the result of the shift operation is not yet available.

In one embodiment, a data validity circuit 135 (e.g., an AND gate) is coupled to the source registers in processor 77. The data validity circuit determines the validity of the data in the source, e.g., in source registers and indicates the validity of the data in a destination (e.g., a destination register) as follows: If any source register has invalid data (e.g., the validity bit is a logic '0') then the output of the data validity circuit is logic '0', i.e., the data validity circuit 135 sets the validity bit of the destination (e.g., a destination register) to a logic '0'.

In one embodiment, checker unit 145 has its inputs coupled to execution unit 115, and to one or more destination registers. In particular, checker unit 145 has its input coupled to one or more register locations that store the validity bits (e.g., the validity bit stored in register location 125N of register 120N). In addition, checker unit 145 has its outputs e.g., outputs 116 and 161 coupled to scheduler 105. In one embodiment, the instruction from execution unit 115, and the validity bit corresponding to the output registers are input into checker unit 145. If the validity bit in register location 125N of register 120N indicates that the data in register 120N is invalid, then checker unit 145 re-schedules for execution the instruction that caused the data to be invalid. In order to re-schedule the instruction for execution, checker unit 145 may activate a scheduler control signal 116 that causes scheduler 105 to stop scheduling instructions for the execution unit 115. In one embodiment, scheduler control signal 116 is eliminated as scheduler 105 automatically schedules the oldest ready instructions for scheduling (i.e., instructions that are old in time and are ready for scheduling). In one embodiment, checker unit 145 outputs the instruction that caused the data to be invalid for re-execution via re-schedule line 161. In alternate embodiments, the instruction that needs to be re-executed is stored within scheduler 105 and is automatically scheduled for re-execution, as it is the oldest ready instruction. In one embodiment, checker unit 145 has one or more buffers to store instructions from execution unit 115 along with the corresponding validity bit. Checker unit 145 reschedules for execution those instructions that have a corresponding validity bit that indicates invalid data, and retires those instructions that execute properly (i.e., with valid data in the output register).

Although the checker unit 145 in the embodiment of FIG. 1 is illustrated as a separate unit, other embodiments may have the checker unit incorporated within execution unit 115, or within scheduler 105 to form an integral unit. In one embodiment, the checker unit 145 may be eliminated from processor 77. The validity bit may be used as a control signal to control the operation of scheduler 105. For example, when the data in a destination register is invalid, the validity bit is used to stop the scheduler from sending new instructions to the execution unit, and the instruction that caused the invalid data to be generated is re-execution by execution unit 115.

If during the time an instruction is re-scheduled for execution the data in the source registers become valid, then following the re-execution of the instruction the validity bit in output register 120N is set to indicate valid data. In particular, each time the instruction is re-executed, the validity bit is re-generated, so if the data in the source becomes valid, the result in the destination is valid and the validity bit in the destination indicates a valid result.

As illustrated in FIG. 1 retirement unit 155 is coupled to checker unit 145. Retirement unit receives instructions from checker unit 145 that have properly executed by execution unit 115. Retiring instructions free up processor resources and permits additional instructions to execute.

Thus, as illustrated in FIG. 1, if either, or both, source registers 120A or 120B have invalid data (indicated by validity bits in register locations 125A and 125B set to a logic '0') then destination register 120N has invalid data, and data validity circuit 135 indicates the validity of the data in the destination register 120N by setting validity bit in register location 125N of the destination register 120N to a logic '0'. Therefore, if scheduler 105 schedules an instruction (e.g., an add instruction) in execution unit 115 and invalid data for the add instruction is loaded in either source register 120A or 120B, then after the execution unit 115 performs the add instruction, invalid data is written by the execution unit to destination register 120N. Either prior to or concurrently with execution unit 115 performing the add instruction, the data validity circuit 135 sets validity bit 125N to a logic '0' (indicating invalid data in destination register 120N).

Although, the embodiment of FIG. 2 illustrates an AND gate as the data validity circuit 135, other embodiments may use other circuits and/or gates for the data validity circuit. For example, if a cache miss occurs and the validity bit in the source register is set to a logic '0', an OR gate may be used to detect the validity of the data in the source registers. The OR gate writes a logic 0 to the destination register (indicating the data in the destination register is invalid) if either or both of the source registers have invalid data.

Figure 3:
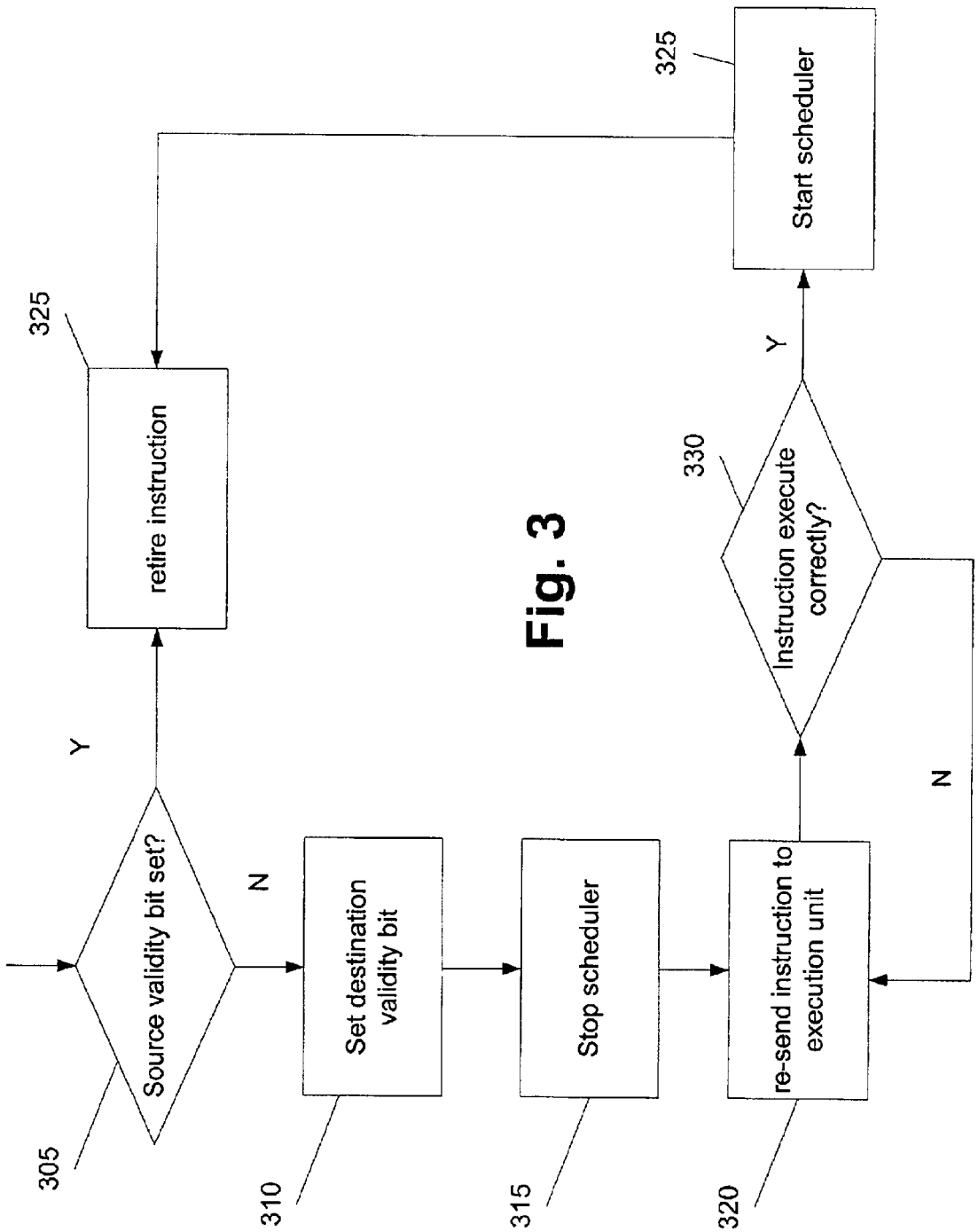
FIG. 3 illustrates a flow diagram for processing instructions according to one embodiment of the invention.

FIG. 3 illustrates a flow diagram for processing instructions according to one embodiment of the invention. As illustrated in FIG. 3, at 305 for a particular instruction executed by processor 77 a determination is made whether the validity bit is set (e.g., to a logic '1') in a source e.g., a source register (indicating invalid data). If the validity bit is not set in the source register, the instruction that is executed by execution unit 115 is retired (see FIG. 1). If the validity bit is set, at 310 the data validity circuit 135 sets the validity bit in the destination register. Concurrently, with setting the validity bit in the destination register, at 315 a signal is sent e.g., by the checker unit 145 to re-execute the instruction. At 320, the scheduler re-executes the instruction. After re-execution of the instruction, at 330 a determination is made whether the reexecution of the instruction yielded valid data. If during the re-execution of the instruction the destination register receives valid data, at 325 the checker unit may send a signal to scheduler 105 to remove the instruction from the scheduler, and retires the instruction that executed correctly. If the instruction did not execute properly, the execution unit re-executes the instruction.

Embodiments of the invention may be represented as a software product stored on a machine-accessible medium (also referred to as a computer-accessible medium or a processor-accessible medium). The machine-accessible medium may be any type of magnetic, optical, or electrical storage medium including a diskette, CD-ROM, memory device (volatile or non-volatile), or similar storage mechanism. The machine-accessible medium may contain various sets of instructions, code sequences, configuration information, or other data to execute the method illustrated in FIG. 3.

Thus, a method and apparatus have been disclosed for executing instructions in a processor. While there has been illustrated and described what are presently considered to be example embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A processor comprising:
a scheduler to schedule execution of at least one instruction having at least one source location and a destination location as operands, the source location and the destination location each including a validity bit;
an execution unit to execute the instruction; and
a data validity circuit coupled to the execution unit to determine the validity of data in the source location, the data validity circuit to write the validity bit in the destination location based upon the validity bit in the source data storage location, wherein the scheduler re-schedules execution of the instruction if the value of the validity bit of the destination location indicates invalid data.

2. The processor of claim 1 wherein writing a validity bit in a destination location comprises writing a bit in a destination register in the processor to indicate validity of data in the destination location.

3. The processor of claim 1, wherein the data validity circuit further comprises a checker unit, the checker unit to retire an instruction having the destination data storage location as an operand according to the value of a validity bit.

4. The processor of claim 1 wherein the destination data storage location is any one of a register in the processor, cache, and permanent memory, said register, cache, and permanent memory having a bit to indicate validity of data in the register, cache, and the permanent memory.

5. The processor of claim 1 wherein the scheduler re-schedules instructions for re-execution by the execution unit, beginning with the oldest instruction ready instruction.

6. The processor of claim 3 further comprising a retirement unit coupled to the checker unit to receive instructions that execute with valid data in the destination location.

7. The processor of claim 1, wherein the data validity circuit comprises any one of an AND-gate and an OR-gate.

8. The processor of claim 1 wherein the source data storage location is any one of a register in the processor, cache, and permanent memory, said register, cache and permanent memory having a bit to indicate validity of data in the register, cache, and the permanent memory.

9. An method comprising:
writing a bit in one or more source locations of an instruction scheduled for execution, said bit to indicate the validity of the data in each of the one or more source locations;
reading the bit to determine the validity of the data in the one or more source locations;
writing a bit in a destination location of the instruction, said bit to determine the validity of the data in the destination location based on the validity of the bit in the source location; and
re-scheduling the instruction for execution if the bit in the destination location indicates invalid data.

10. The method of claim 9 further comprising retiring the instruction if the bit in the destination location indicates valid data.

11. The method of claim 9 wherein reading the bit to determine the validity of the data in the one or more source locations comprise using any one of an OR-gate and an AND-gate to read the bit in the one or more source locations.

12. An apparatus comprising:
means for writing a bit in one or more source locations of an instruction scheduled for execution, said bit to indicate the validity of the data in each of the one or more source locations;
means for reading the bit to determine the validity of the data in the one or more source locations;
means for writing a bit in a destination location of the instruction said bit to determine the validity of the data in the destination location based on the validity of the bits in the one or more source locations; and
means for re-scheduling the instruction for execution if the bit in the destination location indicates invalid data.

13. The apparatus of claim 12 further comprising means for retiring the instruction if the bit in the destination location indicates valid data.

14. The apparatus of claim 12 wherein the means for reading the bit to determine the validity of the data in the one or more source locations comprises using any one of an OR-gate and an AND-gate to read the bit in the one or more source locations.

15. A computer system comprising:
a bus;

a memory unit coupled to said bus;
a processor including:
  a scheduler to schedule at least one instruction, having at least one source register and a destination register as operands, the source register and the destination register each comprising a validity bit;
  an execution unit to execute the instruction; and
  a data validity circuit coupled to the execution unit to determine the validity of the data in the at least one source register, the data validity circuit to indicate the validity of the data in the destination register, by writing the validity bit in the destination register based upon the validity of the data in the at least one source register; wherein the scheduler re-schedules execution of the instruction if the value of the validity bit of the destination data storage location indicates invalid data.

16. The processor of claim 15 wherein the validity bit is stored contiguous with data bits.

17. The processor of claim 15, wherein the data validity circuit further comprising a checker unit coupled to the execution unit, the checker unit to retire the instruction having the destination data storage location as an operand according to the value of a validity bit;

18. The processor of claim 17 wherein the scheduler re-schedules instructions for re-execution by the execution unit beginning with an oldest instruction ready for execution.

19. The processor of claim 15 further comprising a retirement unit coupled to the checker unit to receive instructions that execute with valid data in the destination register.

20. The apparatus of claim 15, wherein the data validity circuit comprises any one of an AND-gate and an OR-gate.

21. An article of manufacture comprising:
  a machine-accessible medium including instructions that, when executed by a machine, causes the machine to perform operations comprising
  writing a bit in one or more source registers of an instruction scheduled for execution, said bit to indicate the validity of the data in each of the one or more source registers;
  reading the bit to determine the validity of the data in the one or more source registers;
  writing a bit in a destination register of the instruction to determine the validity of the data in the destination register based on the validity of the bits in the one or more source registers; and
  re-scheduling the instruction for execution if the bit in the destination register indicates invalid data.

22. The article of manufacture as in claim 21, further comprising instructions for retiring the instruction if the bit in the destination register indicates valid data.

23. The article of manufacture as in claim 21, wherein instructions for reading the bit to determine the validity of the data in the one or more source registers comprises further instructions for using at least one of an OR-function and an AND-function to examine the bit in the one or more source registers.

* * * * *